United States Patent [19]
Hill

[11] 3,739,337
[45] June 12, 1973

[54] FUEL GAUGE OPERATING CIRCUITS FOR ROAD VEHICLES

[75] Inventor: William Frank Hill, Stafford, England

[73] Assignee: Joseph Lucas (Industries) Limited, Birmingham, England

[22] Filed: Mar. 9, 1971

[21] Appl. No.: 122,477

[30] Foreign Application Priority Data
Apr. 14, 1970 Great Britain.................. 17,559/70

[52] U.S. Cl. ............................ 340/59, 340/244 B
[51] Int. Cl. ......................... B60q 1/00, G01f 23/10
[58] Field of Search................... 340/59, 244 B, 69, 340/52 D; 73/308, 313

[56] References Cited
UNITED STATES PATENTS
3,334,339  8/1967  McCauley, Jr.................. 340/244 B
3,623,043  11/1971 Bozoian.............................. 340/59
2,904,774  9/1959  Bossarte.............................. 340/69

Primary Examiner—John W. Caldwell
Assistant Examiner—Glen R. Swann, III
Attorney—Holman & Stern

[57] ABSTRACT

A fuel gauge operating circuit for a road vehicle has a pair of supply lines powered by the vehicle battery and a thermally operable voltage regulator including a vibrating contact through which the fuel gauge is connected to one supply line. The fuel gauge is connected to the other supply line through a variable resistor the value of which is determined by the level of the fuel in the fuel tank, and a transistor is connected in series with the warning lamp between the supply lines. A switching circuit is connected between the supply lines in series with the voltage regulator contact, and the switching circuit has an input connection to the junction of the fuel gauge and the variable resistor and an output connection to the base of the transistor so that the warning lamp flashes when the fuel level is low.

5 Claims, 1 Drawing Figure

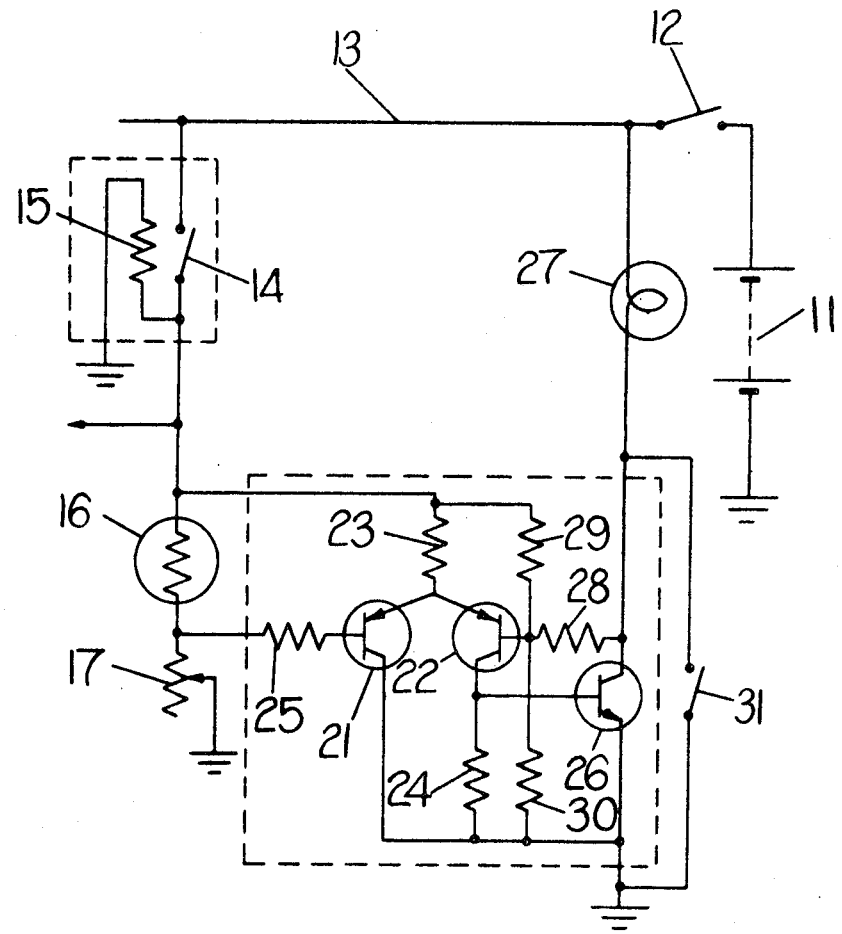

FUEL GAUGE OPERATING CIRCUITS FOR ROAD VEHICLES

BACKGROUND OF THE INVENTION

This invention relates to fuel gauge operating circuits for road vehicles.

SUMMARY OF THE INVENTION

A circuit according to the invention includes a pair of supply lines for connection to the vehicle battery, a fuel gauge including a thermally sensitive element the current flow through which determines the reading of the gauge, a thermally operable voltage regulator including a contact through which the fuel gauge is connected to one supply line, the contact opening and closing to regulate the voltage applied to the fuel gauge, a variable resistor through which the fuel gauge is connected to the other supply line, the value of said variable resistor being determined by the level of the fuel in the fuel tank, a transistor connected in series with a warning lamp between the supply lines, and a switching circuit connected between the supply lines in series with the voltage regulator contact, the switching circuit having an input connection to the junction of the fuel gauge and the variable resistor, and an output connection to the base of the transistor, and serving when the level of the fuel in the fuel tank falls to a predetermined value to turn on the transistor, so that the warning lamp flashes under the control of the voltage regulator contact.

Preferably, said switching circuit and the transistor constitute a bridge network so that the operating circuit is not sensitive to the voltage of the battery.

If desired, a further switch may be connected across the transistor, the switch being operated in response to some predetermined condition, for example the handbrake being applied, so that the warning lamp is illuminated when the handbrake is applied. A distinction will be given between the handbrake being operated and the fuel being low, because the operation of the warning lamp when the handbrake is operated will be continuous.

BRIEF DESCRIPTION OF THE DRAWING

The accompanying drawing is a circuit diagram illustrating one example of the invention.

DESCRIPTION OF THE PREFERRED EMBODIMENT

Referring to the drawing, the battery 11 of a road vehicle has its negative terminal earthed to constitute one supply line, and its positive terminal connected through the ignition switch 12 of the vehicle to a second supply line 13. Mounted on the vehicle is a thermally operable voltage regulator which includes a contact 14 and a heater 15 for operating the contact 14, one end of the heater being earthed and its other end being connected to the line 13 through the contact 14. The contact 14 serves to connect the supply line 13 to one side of a fuel gauge 16, the other side of which is connected to earth through a variable resistor 17 which is of conventional form and is mounted in the fuel tank so that the resistance of the resistor 17 is determined by the amount of fuel in the fuel tank. The fuel gauge 16 is also of conventional form, and includes a bimetal strip the current flow through which determines the reading of the fuel gauge. The voltage regulator acts in known manner to regulate the voltage applied to the fuel gauge 16, and the same voltage regulator is also used to control other instruments on the vehicle, for example the water temperature gauge. The resistor 17 determines the current flowing through the fuel gauge 16, so that a reading is given representing the quantity of fuel in the fuel tank.

There is further provided a switching circuit including a pair of p-n-p transistors 21, 22 having their emitters connected through a common resistor 23 to the junction of the fuel gauge 16 and contact 14. The transistor 21 has its collector earthed, and the transistor 22 has its collector connected to earth through a resistor 24. An input to the switching circuit is supplied from the junction of the fuel gauge 16 and resistor 17 by way of resistor 25. There is further provided an n-p-n transistor 26, the emitter of which is connected to earth and the collector of which is connected to the line 13 through a warning lamp 27. The base of transistor 22 is connected to the join of a series pair of resistors 29 and 30 connected from the output of the thermal voltage regulator to earth. A further resistor 28 is connected between the collector of transistor 26 and the base of transistor 22. The base of the transistor 26 is connected to the collector of the transistor 22.

A bridge network is constituted by the gauge unit 16, the tank unit 17, and resistors 29 and 30. This bridge circuit is supplied via contact 14, and the unbalance voltage between 16 – 17 junction and 29 – 30 junction is used as the input signal to the long-tailed pair differential amplifier constituted by transistors 21 and 22.

In use, the fuel gauge 16 operates in the conventional manner and, provided the level of fuel in the tank is above a predetermined value, the transistor 21 is held on whenever the contact 14 is closed by base current flowing via resistor 25. The volt drop across resistor 23 caused by emitter current of transistor 21 holds the emitter potential of transistor 22 below the threshold for conduction on this transistor. (This threshold is determined by the values of resistors 29 and 30 and slightly by the value of resistor 28). The transistor 22 is off and the transistor 26 is also off so that the lamp 27 is not illuminated. The transistor 21 will of course cease to conduct when the contact 14 is open, but there will then be no supply to transistor 21 and 22 and no base current will be provided to transistor 26 in consequence so that the lamp 27 is still off. When the predetermined minimum level is reached, however, the voltage at the junction of the fuel gauge 16 and 17 rises to a value sufficient to enable transistor 22 to conduct sufficiently to enable transistor 26 to conduct, whereupon regenerative feedback via resistor 28 causes a cumulative snap action turn on of transistors 22 and 26, resulting in 26 becoming "bottomed", and lamp 27 becoming illuminated. The circuit remains in this condition whilst the thermal voltage regulator contact 14 remains closed unless the tank unit resistance falls sufficiently to enable the circuit to "toggle" back to its prior state. The value of resistor 28 is chosen to give the switching action a differential of the order of 0.1 volts, referred to the input voltage appearing at the junction of 16 and 17. So long as the voltage at this input terminal exceeds the threshold value the lamp will flash on and off in synchronism with the closing and opening of the contact 14 to give warning to the driver that further fuel is required. In operation this signal initially appears intermittently owing to the movement of the fuel contents in the tank while the vehicle is being driven. The indications become gradually more persistent as the mean fuel level falls until a continuously flashing signal is produced. It will be appreciated that the regenerative feedback used to provide an abrupt switching action serves to minimize the dissipation in transistor 26 since this transistor can operate only in a "bottomed" condition or completely turned off.

If desired, the collector-emitter of the transistor 26 can be bridged by a further switch 31 which when closed illuminates the lamp 27. This switch can, by way of example, be closed when the choke is in use, or when the handbrake of the vehicle is applied. It will be appreciated that the warning given by the lamp 27 will be continuous when the switch is closed, so that the driver will be able to distinguish between this warning and the flashing warning given when the fuel is low.

Preferably the operating differential of the circuit should not be too large, as otherwise, if a switch is connected across 26 for providing an additional warning light function using the same lamp, said switch if initially closed would trigger the circuit into its conducting state from which it would not recover when the additional switch opened, either until the thermal voltage regulator contact 14 next opened or unless the input voltage from the junction 16 and 17 were much lower than the normal threshold level. (On switching on the ignition switch, several seconds usually elapse before the thermal voltage regulator 15 warms up sufficiently to commence oscillating contact 14).

If desired, further connections can be made to the base of the transistor 26 so that the transistor 26 is turned on in response to other predetermined conditions. These further connections can be additional to, or instead of, the additional switches 31.

Having thus described my invention what I claim as new and desire to secure by Letters Patent is:

1. A fuel gauge operating circuit for a road vehicle, including a pair of supply lines for connection to the vehicle battery, a fuel gauge including a thermally sensitive element the current flow through which determines the reading of the gauge, a thermally operable voltage regulator including a contact through which the fuel gauge is connected to one supply line, the contact opening and closing to regulate the voltage applied to the fuel gauge, a variable resistor through which the fuel gauge is connected to the other supply line, the value of said variable resistor being determined by the level of fuel in the fuel tank, a transistor connected in series with a warning lamp between the supply lines, and a switching circuit connected between the supply lines in series with the voltage regulator contact, the switching circuit having an input connection to the junction of the fuel gauge and the variable resistor, and an output connection to the base of the transistor, and serving when the level of fuel in the fuel tank falls to a predetermined value to turn on the transistor, so that the warning lamp flashes under the control of the voltage regulator contact.

2. A circuit as claimed in claim 1 in which the switching circuit and the transistor constitute a bridge network so that the operating circuit is not sensitive to the voltage of the battery.

3. A circuit as claimed in claim 1 including a further switch which is operated in response to a predetermined condition, the warning lamp being illuminated when the switch is closed.

4. A circuit as claimed in claim 3 in which the further switch is closed when the handbrake of the vehicle is applied.

5. A circuit as claimed in claim 3 in which the further switch is connected across the transistor.

* * * * *